(12) United States Patent
Gruenwald et al.

(10) Patent No.: US 9,328,641 B2
(45) Date of Patent: May 3, 2016

(54) POWER MANAGEMENT SYSTEM THAT INCLUDES A WET EXHAUST SYSTEM

(71) Applicant: Kohler Co., Kohler, WI (US)

(72) Inventors: David John Gruenwald, Menasha, WI (US); Douglas J. Yoder, Oshkosh, WI (US); George E. Phillips, Oshkosh, WI (US)

(73) Assignee: Kohler Co., Kohler, WI (US)

( * ) Notice: Subject to any disclaimer, the term of this patent is extended or adjusted under 35 U.S.C. 154(b) by 346 days.

(21) Appl. No.: 13/624,082

(22) Filed: Sep. 21, 2012

(65) Prior Publication Data

US 2014/0086804 A1    Mar. 27, 2014

(51) Int. Cl.
*B01D 50/00* (2006.01)
*F01N 3/04* (2006.01)
*F01N 3/05* (2006.01)
*F01N 3/28* (2006.01)
*F01N 13/18* (2010.01)

(52) U.S. Cl.
CPC .. *F01N 3/04* (2013.01); *F01N 3/05* (2013.01); *F01N 3/2803* (2013.01); *F01N 3/2842* (2013.01); *F01N 13/185* (2013.01); *F01N 2260/022* (2013.01); *F01N 2260/024* (2013.01); *F01N 2450/02* (2013.01); *F01N 2450/20* (2013.01); *F01N 2470/24* (2013.01); *F01N 2590/02* (2013.01); *Y02T 10/20* (2013.01); *Y10T 29/49229* (2015.01)

(58) Field of Classification Search
CPC ....... F01N 3/04; F01N 3/2803; F01N 12/185; F01N 2450/20; F01N 2590/02
USPC .......................... 422/177, 180, 173; 440/89 H
See application file for complete search history.

(56) References Cited

U.S. PATENT DOCUMENTS 3,817,714 A * 6/1974 Wiley ............................ 422/173
3,935,705 A    2/1976 Hergoualch
4,032,310 A    6/1977 Ignoffo
(Continued)

FOREIGN PATENT DOCUMENTS

CN    101896787    11/2010
CN    201705432    1/2011
(Continued)

OTHER PUBLICATIONS

"European Application Serial No. 13183090.3, European Search Report mailed Mar. 21, 2014", 12 pgs.
(Continued)

*Primary Examiner* — Tom P Duong
(74) *Attorney, Agent, or Firm* — Schwegman, Lundberg & Woessner, P.A.

(57) ABSTRACT

Some embodiments relate to a catalytic assembly for an engine. The catalytic assembly includes a cooling housing that receives a coolant (e.g., seawater). A catalyst housing is disposed within the cooling housing such that the coolant flows between the catalyst housing and the cooling housing. A catalyst substrate is positioned within the catalyst housing such that exhaust gases from the engine flows through the catalyst substrate. The catalyst substrate serves to covert harmful emissions found in the exhaust gases to less harmful emissions. The catalyst housing includes a first fitting and cooling housing includes a second fitting that mates with the first fitting to prevent rotation of the catalyst housing relative to the cooling housing.

11 Claims, 5 Drawing Sheets

(56) References Cited

U.S. PATENT DOCUMENTS

| | | | |
|---|---|---|---|
| 4,049,388 A * | 9/1977 | Scheitlin et al. | 422/171 |
| 4,142,864 A | 3/1979 | Rosynsky et al. | |
| 4,207,661 A | 6/1980 | Mase et al. | |
| 4,347,219 A | 8/1982 | Noritake et al. | |
| 4,382,808 A | 5/1983 | Van Wormer, Jr. et al. | |
| 4,396,664 A | 8/1983 | Mochida et al. | |
| 4,397,817 A | 8/1983 | Otani et al. | |
| 4,420,933 A | 12/1983 | Kajitani et al. | |
| 4,448,754 A | 5/1984 | Isogai et al. | |
| 4,663,934 A | 5/1987 | Sickels | |
| 4,711,088 A | 12/1987 | Berchem et al. | |
| 5,148,675 A | 9/1992 | Inman | |
| 5,212,949 A | 5/1993 | Shiozawa | |
| 5,220,789 A | 6/1993 | Riley et al. | |
| 5,290,974 A * | 3/1994 | Douglas et al. | 181/228 |
| 5,408,827 A | 4/1995 | Holtermann et al. | |
| 5,431,706 A | 7/1995 | Paas | |
| 5,555,621 A | 9/1996 | Tanabe et al. | |
| 5,656,245 A | 8/1997 | Fujisawa et al. | |
| 5,724,735 A | 3/1998 | Ickes et al. | |
| 5,740,670 A | 4/1998 | Woods | |
| 5,881,554 A | 3/1999 | Novak et al. | |
| 5,911,683 A | 6/1999 | Cui et al. | |
| 5,930,995 A | 8/1999 | Watanabe et al. | |
| 6,250,976 B1 | 6/2001 | Ozawa | |
| 6,338,826 B2 | 1/2002 | Yamada et al. | |
| 6,397,589 B1 | 6/2002 | Beson et al. | |
| 6,487,854 B2 | 12/2002 | Maus | |
| 6,605,259 B1 | 8/2003 | Henry | |
| 6,635,227 B1 | 10/2003 | Shibata et al. | |
| 6,667,013 B1 | 12/2003 | Nilsson | |
| 6,685,888 B1 | 2/2004 | Shibata et al. | |
| 6,799,422 B2 | 10/2004 | Westerbeke, Jr. et al. | |
| 6,840,034 B2 | 1/2005 | Mills et al. | |
| 6,892,531 B2 | 5/2005 | Rim | |
| 6,946,013 B2 | 9/2005 | Alward et al. | |
| 7,241,426 B2 | 7/2007 | Hardesty et al. | |
| 7,311,066 B1 | 12/2007 | Westerbeke, Jr. | |
| 7,314,044 B2 | 1/2008 | Westerbeke | |
| 7,497,079 B2 | 3/2009 | Yoshida et al. | |
| 7,552,586 B1 | 6/2009 | White | |
| 7,578,979 B2 | 8/2009 | Alward et al. | |
| 7,708,953 B2 * | 5/2010 | Cremeens et al. | 422/168 |
| 7,726,120 B2 | 6/2010 | Westerbeke | |
| 7,788,913 B2 | 9/2010 | Midgley et al. | |
| 7,807,120 B2 | 10/2010 | Hansen et al. | |
| 7,832,196 B2 | 11/2010 | Westerbeke, Jr. | |
| 2003/0162451 A1 | 8/2003 | Ozawa | |
| 2005/0150222 A1 | 7/2005 | Kalish et al. | |
| 2007/0157467 A1 | 7/2007 | Cremeens et al. | |
| 2010/0112878 A1 | 5/2010 | White et al. | |
| 2010/0229540 A1 | 9/2010 | Waggoner et al. | |
| 2010/0240268 A1 | 9/2010 | Westerbeke | |
| 2010/0261392 A1 | 10/2010 | Ozawa | |
| 2011/0120435 A1 * | 5/2011 | Yang | 123/590 |

FOREIGN PATENT DOCUMENTS

| | | |
|---|---|---|
| DE | 3343587 A1 | 7/1984 |
| DE | 19608870 C1 | 10/1997 |
| WO | WO-2004/106705 A1 | 12/2004 |
| WO | WO-2008/025920 A1 | 3/2008 |
| WO | WO-2008/148634 A1 | 12/2008 |

OTHER PUBLICATIONS

"European Application Serial No. 13183090.3, Partial European Search Report mailed Dec. 13, 2013", 7 pgs.

"Chinese Application No. 201310421622.7, First Office Action mailed Jul. 3, 2015", 8 pgs.

"European Patent Office Application No. 13 183 090.3, Communication pursuant to Article 94(3) to EPC dated Jun. 30, 2015", 4 pgs.

* cited by examiner

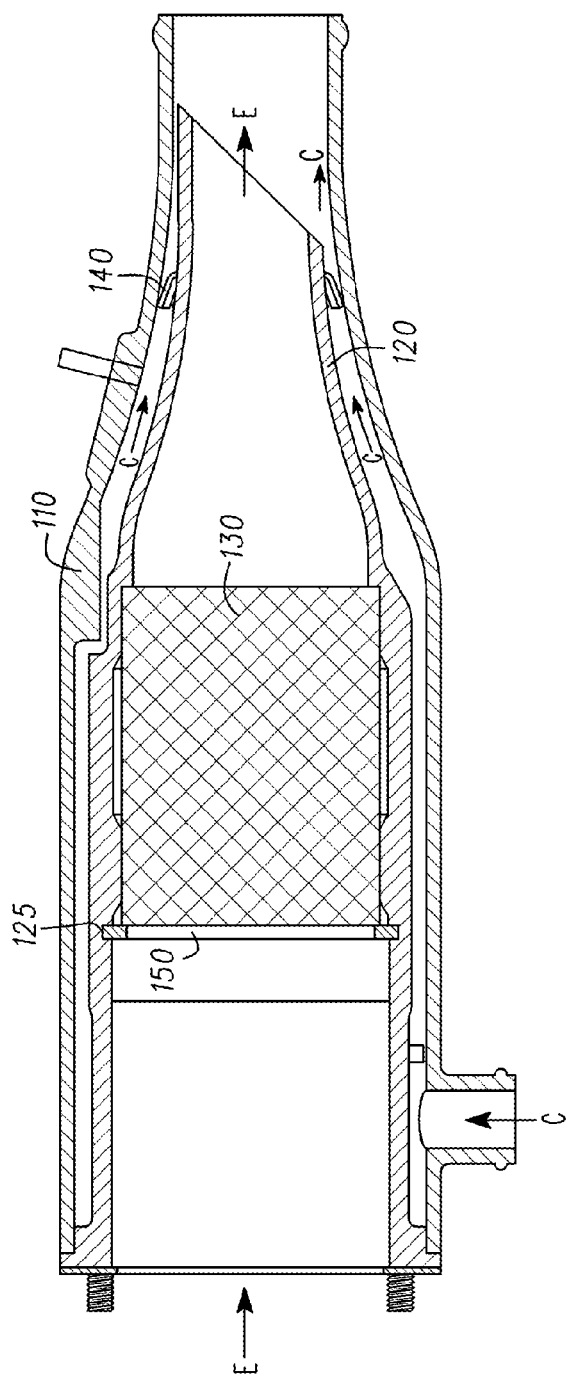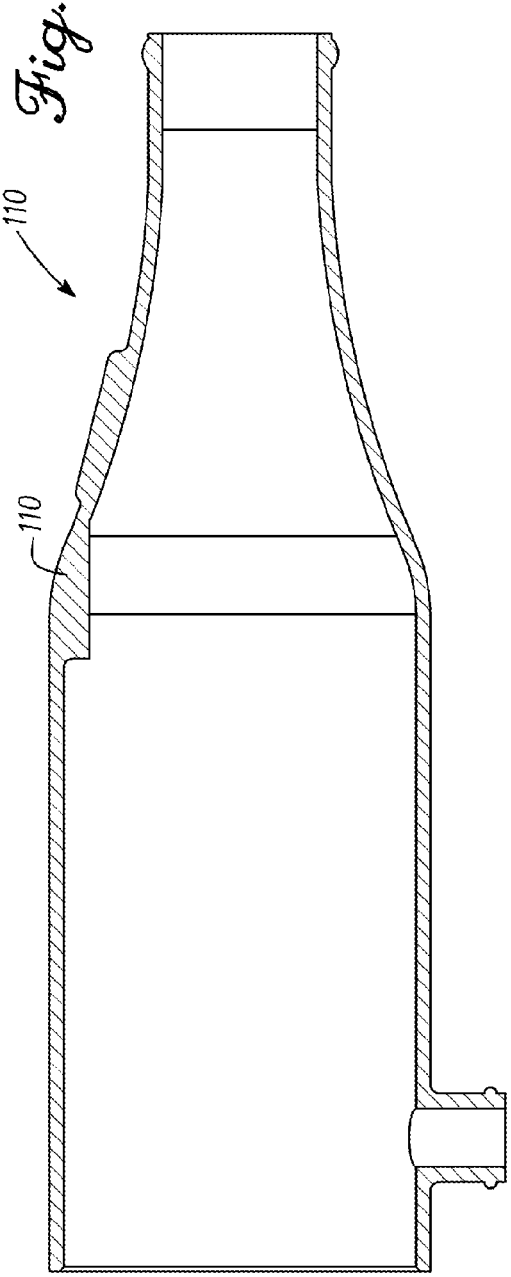

POWER MANAGEMENT SYSTEM THAT INCLUDES A WET EXHAUST SYSTEM

TECHNICAL FIELD

Embodiments pertain to a power management system that includes a an exhaust system, and more particularly to a power management system that includes a wet exhaust system.

BACKGROUND

Some existing power management systems typically includes exhaust systems that project a combination of gaseous and liquid emissions that are produced as part of operating an engine (especially a marine engine). These types of systems that emit both gaseous and liquid emissions are referred to as wet exhaust systems.

One of the important factors in wet exhaust systems is to reduce the amount of harmful emissions that are produced during operation of the engine. The amount of harmful emissions is typically reduced in existing systems by including a catalytic substrate that intercepts and converts harmful gaseous emissions into less harmful elements.

Some existing systems attempt to cool the exhaust gases after the gases are converted by the catalytic substrate but before the converted gases exit the wet exhaust system. The exhaust gases need to remain as hot as possible before entering the catalytic substrate in order to promote more efficient conversion by the catalytic substrate.

One of the drawbacks with existing power management systems is that catalytic substrate is overcooled due to the design of such systems. This overcooling of the catalytic substrate decreases the conversion efficiency of the substrate.

Another drawback with existing power management systems is that they are typically relatively expensive and complicated to manufacture. This increased cost associated with fabricating such systems adds unwanted cost to producing products that include wet exhaust systems.

BRIEF DESCRIPTION OF THE DRAWINGS

FIG. 1 illustrates an example catalytic assembly for an engine.

FIG. 2 is a schematic section view of an example cooling housing that may be used in the catalytic assembly shown in FIG. 1.

SNAP RING

Figure 7:
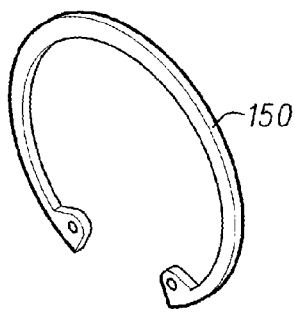

FIG. 7 shows an example restraining member that may be used in the catalytic assembly shown in FIG. 1 before the restraining member is inserted into the catalyst housing.

Figure 8:
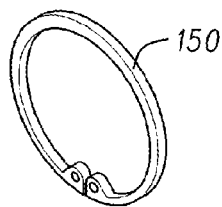

FIG. 8 shows the restraining member of FIG. 7 after the restraining member is inserted into the catalyst housing but before the restraining member is inserted into an annular groove in the catalyst housing.

Figure 9:
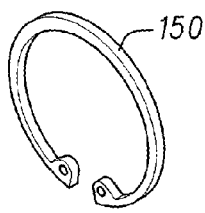

FIG. 9 shows the restraining member of FIG. 7 after the restraining member is inserted into the annular groove in the catalyst housing.

Figure 10:
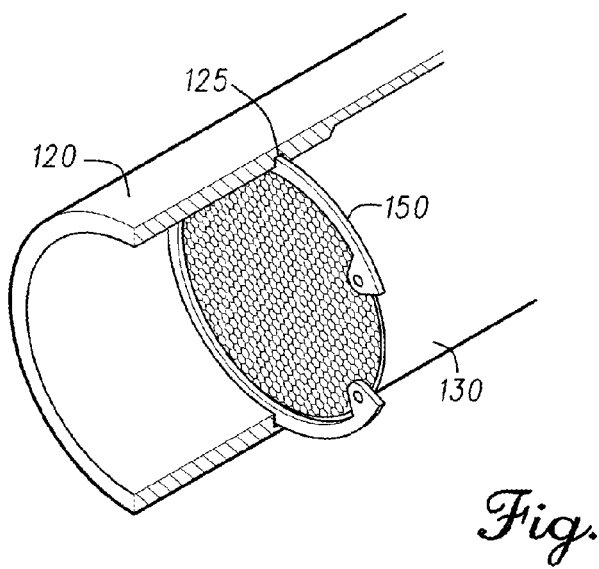

FIG. 10 shows a partial perspective section view where the restraining member of FIG. 7 is inserted into the annular groove in the catalyst housing.

Figure 11:
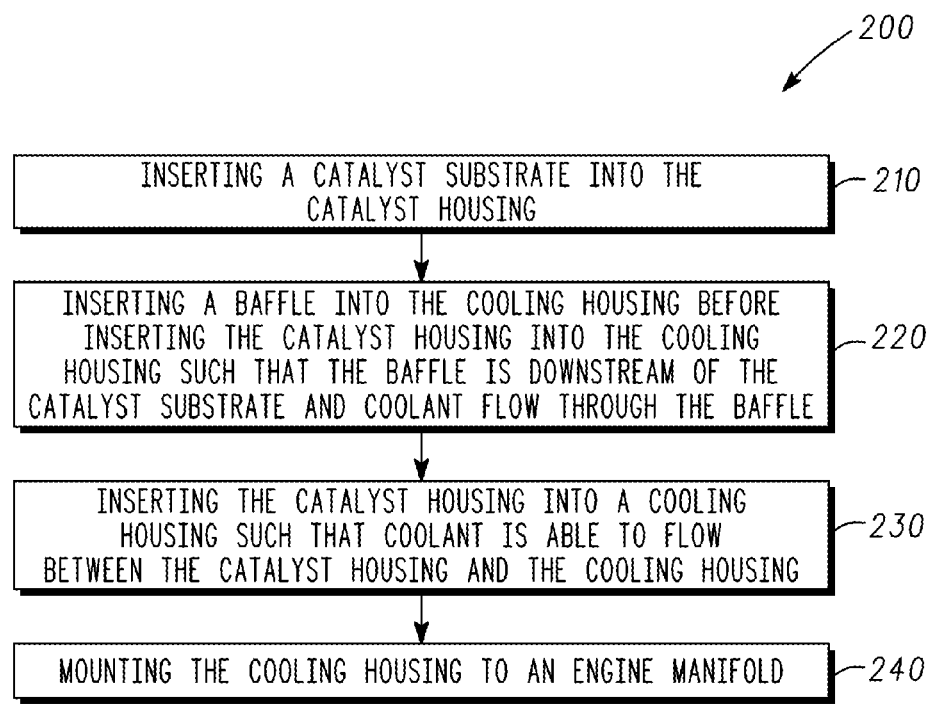

FIG. 11 illustrates an example method of assembling a catalyst assembly.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 3:
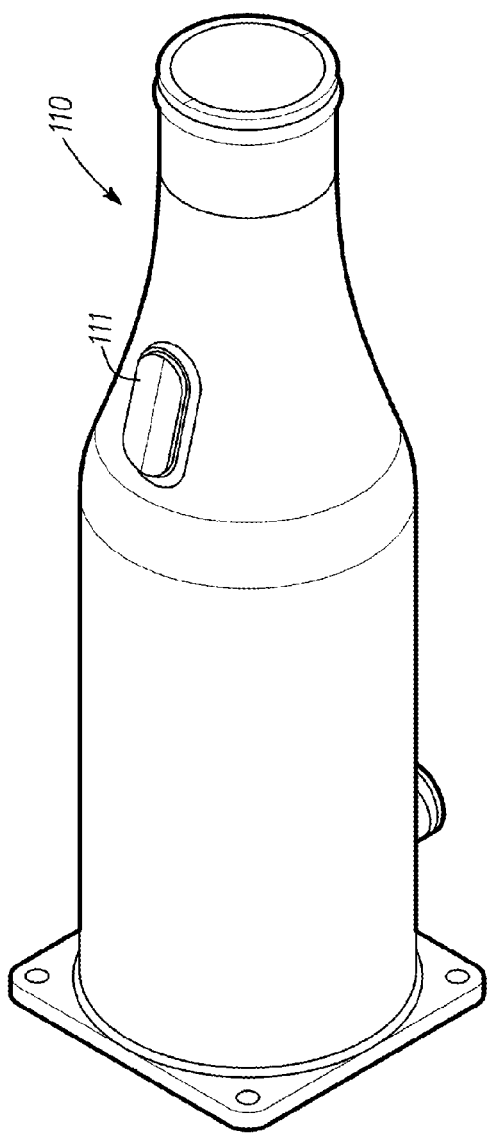
FIG. 3 is a perspective view of the example cooling housing shown in FIG. 2.

FIG. 1 illustrates an example catalytic assembly 100 for an engine (not shown). The catalytic assembly 100 includes a cooling housing 110 that receives a coolant C (e.g., seawater). FIGS. 2 and 3 show the cooling housing 110 separate from the rest of the catalytic assembly 100.

Figure 4:
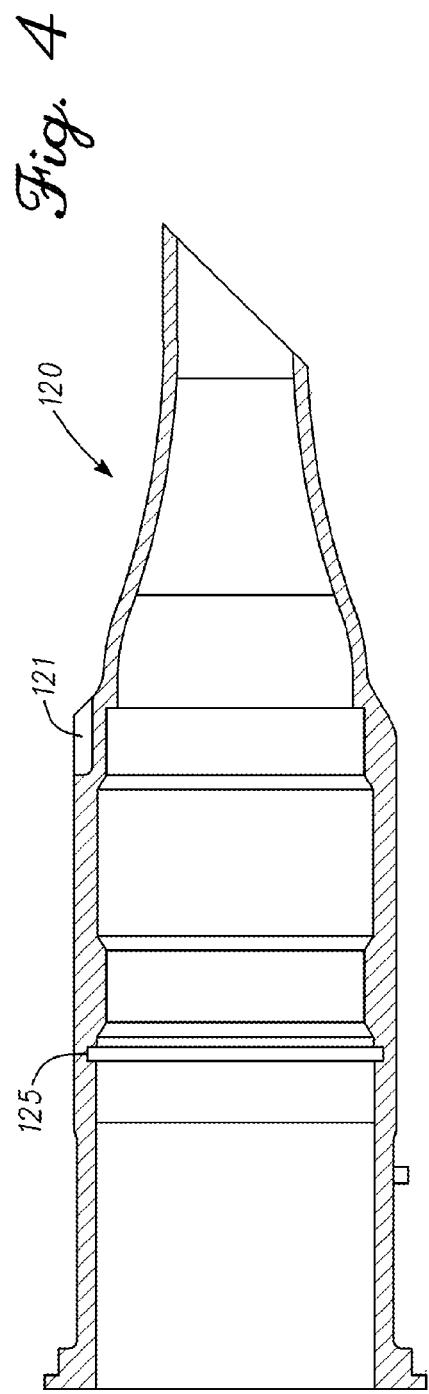
FIG. 4 is a schematic section view of an example catalyst housing that may be used in the catalytic assembly shown in FIG. 1.
Figure 5:
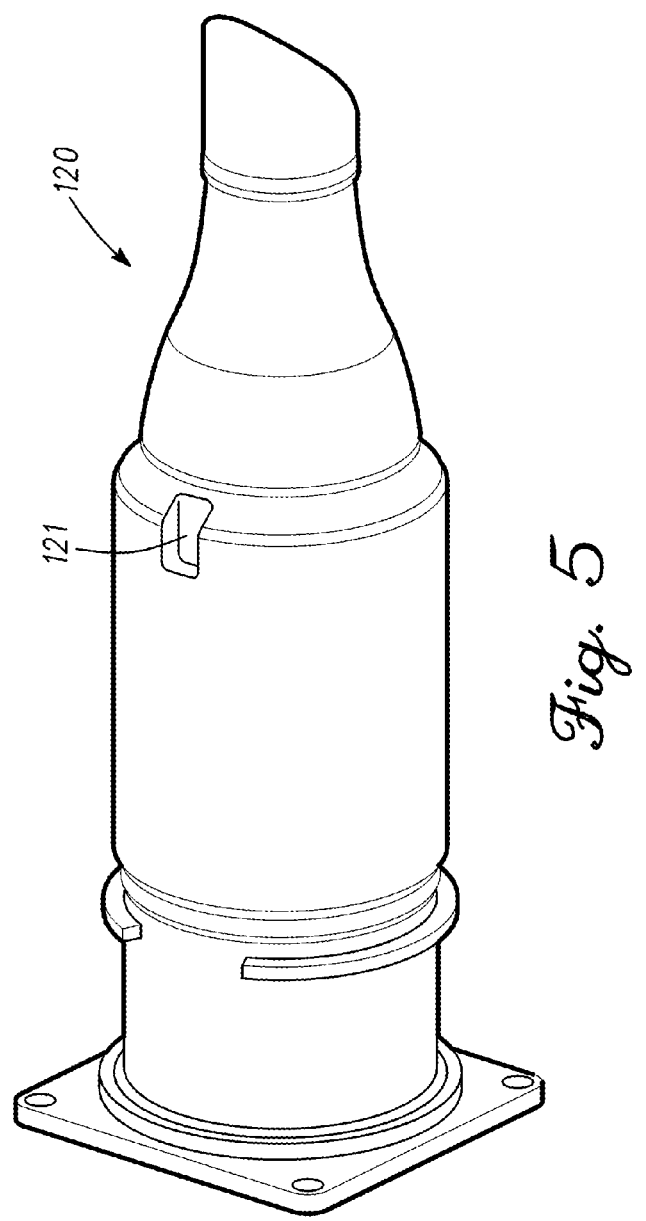
FIG. 5 is a perspective view of the example catalyst housing shown in FIG. 4.

A catalyst housing 120 is disposed within the cooling housing 110 such that the coolant C flows between the catalyst housing 120 and the cooling housing 120. FIGS. 4 and 5 show the catalyst housing 120 separate from the rest of the catalytic assembly 100.

A catalyst substrate 130 (see FIG. 1) is positioned within the catalyst housing 120 such that exhaust gases E from the engine flows through the catalyst substrate 130. The catalyst substrate 130 serves to covert harmful emissions found in the exhaust gases E to less harmful emissions.

Figure 6:
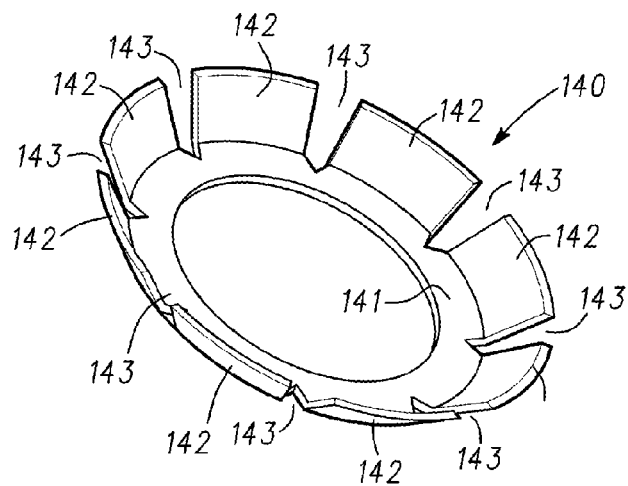
FIG. 6 shows an example baffle that may be used in the catalytic assembly shown in FIG. 1.

In some embodiments, a baffle 140 is positioned between the catalyst housing 120 and the cooling housing 110 downstream of the catalyst substrate 130 such that coolant C flows through the baffle 140. FIG. 6 shows most clearly an example baffle 140 that may be included in the catalytic assembly 100. As an example, the baffle 140 may be formed of stainless steel, although other materials are contemplated.

In the example embodiment that is illustrated in FIG. 6, the baffle 140 may include an annular member 141 and projections 142 extending from the annular member 141 at angle to the annular member 141. The baffle 140 includes openings 143 between the projections 142 such that coolant flows through the openings 143.

As an example, the baffle 140 may include eight openings 143 such that coolant flows through the eight openings 143. In addition, the openings 143 may be positioned at equal (or unequal) intervals around the annular member 141.

In some embodiments, the catalyst housing 120 includes a first fitting 121 and cooling housing 110 includes a second fitting 111 that mates with the first fitting 121 to prevent rotation of the catalyst housing 120 relative to the cooling housing 110.

In the illustrated example embodiments, the first fitting 121 is a detent and the second fitting 111 is a projection (e.g. a key) that is inserted into the detent. It should be noted that the type of first fitting 121 and second fitting 111 that are used in the respective catalyst housing 120 and cooling housing 110 depend in part on overall design of the catalytic assembly 100.

Alternative embodiments are contemplated where the first fitting 121 is a projection and the second fitting 111 is a detent that receives the projection. In still other embodiments, the first fitting 121 on the catalyst housing 120 may be inserted (or received depending on the design) into the second fitting 111 on the cooling housing 110 until the first fitting 121 and the second fitting 111 prevent further insertion of the catalyst housing 120 into the cooling housing 110.

In some embodiments, the catalytic assembly 100 further includes a restraining member 150 that is secured within an annular groove 125 in the catalyst housing 120 to secure the catalyst substrate 130 within the catalyst housing 120. FIGS. 7-10 illustrate an example disc-shaped ring 150 that permits exhaust to flow through the ring 150 into the catalyst substrate 130. As an example, the ring 150 may be formed of stainless steel, although it should be noted that other materials are contemplated.

In the illustrated example embodiments, the annular groove 125 extends around an entire inner surface of the catalyst housing 120. FIG. 7 shows the ring 150 before insertion into the catalyst housing 120. FIG. 8 shows the ring 150 after insertion into the catalyst housing 120 but before insertion into the annular groove 125. FIGS. 9 and 10 show the ring 150 after insertion into the annular groove 125 in the catalyst housing 120.

Referring now also to FIG. 11, another example embodiment relates to a method 200 of assembling a catalyst assembly 100. The method 200 includes [210] inserting a catalyst substrate 130 into a catalyst housing 120 and [230] inserting a catalyst housing 120 into a cooling housing 110 such that coolant C is able to flow between the catalyst housing 120 and the cooling housing 110.

The method 200 further includes [240] mounting the cooling housing 110 to an engine manifold (not shown). The method may further include [220] inserting a baffle 140 into the cooling housing 110 before inserting the catalyst housing 120 into the cooling housing 110 such that the baffle 140 is downstream of the catalyst substrate 130 and coolant flows through the baffle 140.

In some embodiments, [230] inserting a catalyst housing 120 into the cooling housing 110 may include mating a first fitting 121 on the catalyst housing 120 with a second fitting 111 on the cooling housing 110. As an example, mating the first fitting 121 on the catalyst housing 120 with the second fitting 111 on the cooling housing 110 may include inserting a projection on the catalyst housing 120 into a detent on the cooling housing 110 to prevent rotation of the catalyst housing 120 relative to the cooling housing 110.

It should be noted that embodiments are contemplated where mating the first fitting 121 on the catalyst housing 120 with the second fitting 111 on the cooling housing 110 may include inserting a projection on the cooling housing 120 into a detent on the catalyst housing 111 to prevent rotation of the catalyst housing 120 relative to the cooling housing 110. In addition, mating a first fitting 121 on the catalyst housing 120 with a second fitting 111 on the cooling housing 110 may include preventing further insertion of the catalyst housing 120 into the cooling housing 110.

The catalytic assemblies 100 and methods 200 described herein may serve to prevent the catalyst substrate 130 from overcooling during operation of the engine. Preventing overcooling of the catalyst substrate 130 may increase the conversion efficiency of the catalyst substrate 130.

In addition, the catalytic assemblies 100 and methods 200 described herein may promote cost reduction and manufacturability. Decreasing the cost associated with fabricating the catalytic assemblies 100 may reduce the cost of producing products that include the catalytic assemblies 100.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A catalytic assembly comprising:
   a cooling housing that receives a coolant;
   a catalyst housing disposed within the cooling housing such that coolant flows between the catalyst housing and the cooling housing, wherein the catalyst housing includes a first fitting; and
   a catalyst substrate within the catalyst housing such that exhaust flows through the catalyst substrate, wherein the cooling housing includes a second fitting that mates with the first fitting such that the first fitting and second fitting prevent rotation of the catalyst housing relative to the cooling housing without the aid of additional rotation-prevention features.

2. The catalytic assembly of claim 1 wherein the first fitting is a detent and the second fitting is a projection that is inserted into the detent.

3. The catalytic assembly of claim 2 wherein the projection is a key.

4. The catalytic assembly of claim 1 wherein the first fitting is a projection and the second fitting is a detent that is inserted into the projection.

5. The catalytic assembly of claim 1 wherein when the first fitting is mated with the second fitting the catalyst housing is prevented from further insertion into the cooling housing.

6. A catalytic assembly comprising:
   a cooling housing that receives a coolant;
   a catalyst housing disposed within the cooling housing such that coolant flows between the catalyst housing and the cooling housing, wherein the catalyst housing includes a detent; and
   a catalyst substrate within the catalyst housing such that exhaust flows through the catalyst substrate, wherein the cooling housing includes a projection that mates with the detent such that the detent and the projection prevent rotation of the catalyst housing relative to the cooling housing without requiring additional features to prevent rotation.

7. The catalytic assembly of claim 6 wherein the projection is a key.

8. The catalytic assembly of claim 6 wherein when the detent is mated with the projection the catalyst housing is prevented from further insertion into the cooling housing.

9. A catalytic assembly comprising:
   a cooling housing that receives a coolant;
   a catalyst housing disposed within the cooling housing such that coolant flows between the catalyst housing and the cooling housing, wherein the catalyst housing includes a projection; and
   a catalyst substrate within the catalyst housing such that exhaust flows through the catalyst substrate, wherein the cooling housing includes a detent that mates with the projection such that the projection and the detent are configured to prevent rotation of the catalyst housing relative to the cooling housing without additional features.

10. The catalytic assembly of claim 9 wherein the projection is a key.

11. The catalytic assembly of claim 9 wherein when the projection is mated with the detent the catalyst housing is prevented from further insertion into the cooling housing.

* * * * *